W. H. DE VALIN.
STEAM, WATER, AND GAS COCK.
No. 54,305. Patented May 1, 1866.
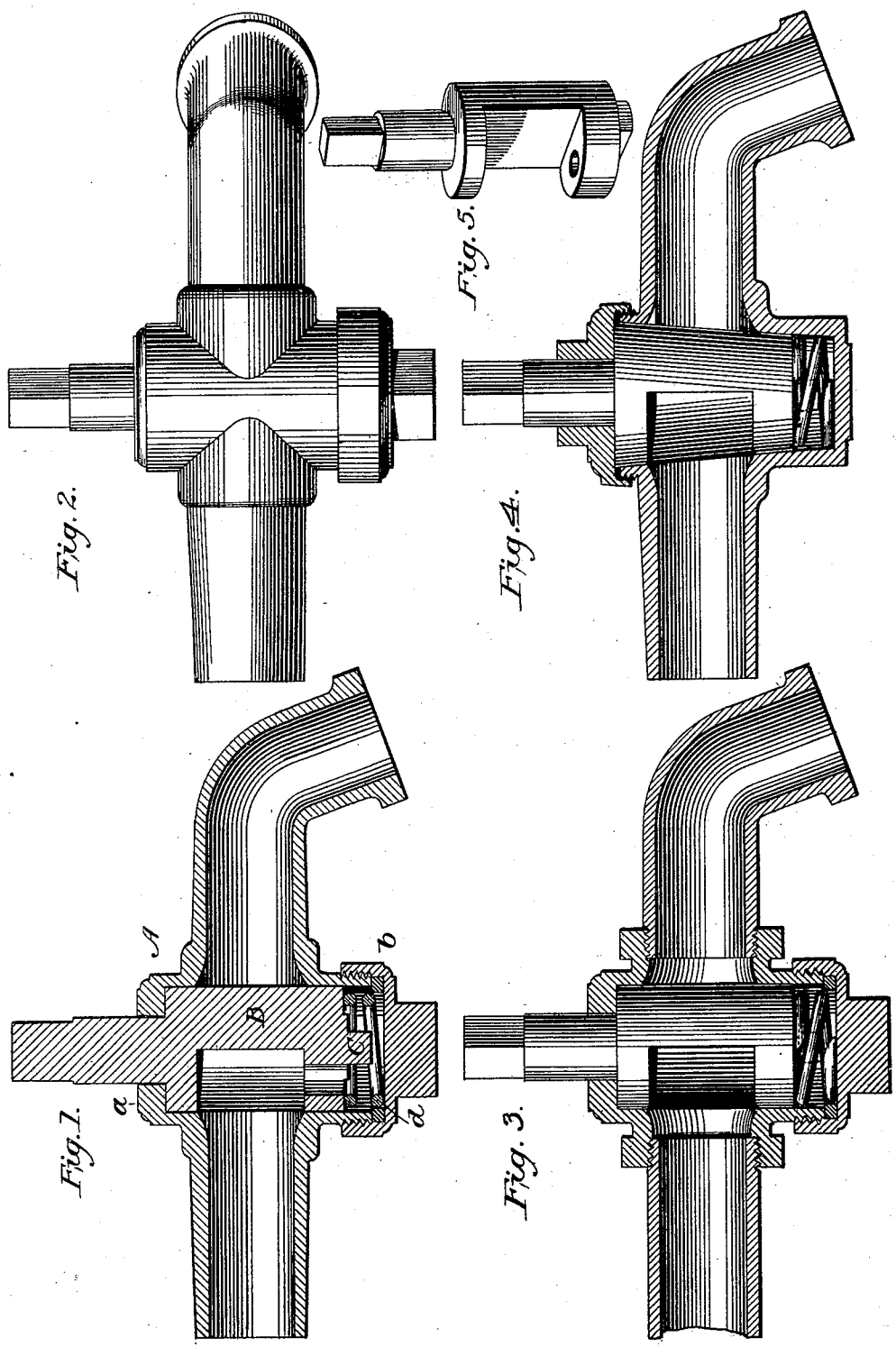

UNITED STATES PATENT OFFICE.

WILLIAM H. DE VALIN, OF SACRAMENTO, CALIFORNIA.

IMPROVEMENT IN STOP-COCKS.

Specification forming part of Letters Patent No. 54,305, dated May 1, 1866.

*To all whom it may concern:*

Be it known that I, WILLIAM H. DE VALIN, of Sacramento, in the county of Sacramento and State of California, have invented certain new and useful Improvements in Steam, Water, and Gas Cocks; and I hereby declare that the following is a full, clear, and exact description of the same, reference being had to the accompanying drawings.

The valves or plugs of steam, water, or gas cocks as heretofore most generally constructed were tapering or of a conical form for the purpose of making the cock steam, water, or gas tight by drawing the plug up or down against its seat. The difficulty attending such cocks was that they were liable to excessive friction and consequently to jam in the case.

The object of this invention is to so construct steam, water, or gas cocks as that while keeping water, steam, or gas tight, they shall have free and easy play and not be liable to jam from excessive friction. To this effect, in lieu of the conical valve or plug, I use within a cylindrical case a cylindrical valve provided with suitable openings or recesses for the operation intended. This valve is held in position within the case by means of a spring or by fitting parts of the case or shoulders. These means, however, are not depended upon for the maintaining of the plug or valve tightly within its seat, but the pressure of the liquid or gaseous fluid, whether it be steam, gas, or water, is used in such manner as to press the plug against its seat with a pressure which is partly equilibrated by acting on opposite sides. For this purpose the plug is recessed or perforated, so as to allow water, steam, or gas to press the plug into its seat. In some cases I further provide the plug, when used in connection with a fluid which is liable to form sediments and collect in the chamber, an agitator—that is, a projection cast onto the plug—which, when the plug is moved upon its axis, will agitate, break up, or disturb the mass of sediment formed, and thus prevent it from packing. These are the principal features of my improved cock.

In the accompanying drawings, I have shown, in Fig. 1, a sectional view of a cock constructed in accordance with this my invention.

The case A in said figure is a hollow cylinder of uniform diameter, partly closed on top by the flange $a$, and closed at the bottom by the cap $b$, which forms a chamber underneath the plug. There are openings at opposite sides for supply and discharge similar to the ones in common use.

The valve B. is fitted to the case, the stem passing through the flange $a$, and the top of the valve fitting against the inside of the flange, so as to make a tight joint. The bottom of the valve has a hole through it to admit water, steam, or gas into the chamber—*i. e.*, between the valve and cap—to bring pressure on the valve and thus to keep it against the flange, the spring $d$ being placed under it to maintain it in place when not subject to pressure.

The projection C, on the bottom of the valve, is intended to stir up any sediment that may accumulate and prevent it from packing hard.

The axis of the case and plug, it will be understood, may be horizontal or vertical, with the discharge-pipe either in a direct line with the receiving-pipe, as shown in Fig. 1, or at right-angles thereto, as shown in Fig. 2; or, again, the chamber may be screwed onto the pipe, as shown in Fig. 3, which latter form is more especially adapted to steam-gage cocks. In some instances it may be convenient to invert the valve and to have the cap on top.

The method described of packing the plug in the case is susceptible of many modifications without departure from the principle of my invention. Thus, the case and plug may be slightly conical, as shown in Fig. 4, which is a sectional elevation of a cock in construction precisely similar to that represented in Fig. 1, with the exception of the taper given to the plug more in conformity with the construction of cocks in general use. In Fig. 5 the plug is shown, in perspective view, detached from the case.

Having thus described my said invention and the manner in which the same is or may be carried into effect, what I claim as my invention is as follows:

1. In steam, water, or gas cocks, constructed and arranged substantially as herein described, the recess in the plug, in combination with a chamber within the case, but outside of the plug, so as to allow steam, water, or gas to pass through and press against the plug in such manner as to prevent leakage, as set forth.

2. In combination with the recessed plug and outside chamber, or the equivalent thereof, the employment of a spring to maintain the plug in position when not under pressure.

3. The combination of a recessed plug and outside chamber with an agitator fast to the plug and projecting into said chamber, as and for the purposes set forth.

In testimony whereof I have signed my name to this specification before two subscribing witnesses.

W. H. DE VALIN.

Witnesses:
SAMUEL CROSS,
JAMES ANTHONY.